United States Patent [19]

Lord

[11] 4,188,512
[45] Feb. 12, 1980

[54] TELEPHONE HOOKSWITCH ACTUATOR AND HANDSET SUPPORT ASSEMBLY

[75] Inventor: John M. Lord, Bensenville, Ill.

[73] Assignee: GTE Automatic Electric Laboratories Incorporated, Northlake, Ill.

[21] Appl. No.: 962,818

[22] Filed: Nov. 22, 1978

[51] Int. Cl.$^2$ ............................................. H04M 1/08
[52] U.S. Cl. ............................ 179/100 C; 179/159; 179/164
[58] Field of Search ............ 179/100 R, 100 C, 159, 179/164, 1 SW, 100 D, 103, 146 R, 147, 178, 189 R

[56] References Cited

U.S. PATENT DOCUMENTS

| | | | |
|---|---|---|---|
| 2,949,509 | 8/1960 | Whidden | 179/159 |
| 3,073,911 | 1/1963 | Mattke et al. | 179/159 |
| 3,558,832 | 1/1971 | Bonis et al. | 179/159 |
| 3,818,150 | 6/1974 | Kunimine | 179/100 C |
| 4,107,481 | 8/1978 | Redshaw | 179/100 C |

OTHER PUBLICATIONS

I. Yamagami, K. Shirai; "Small Size Telephone Set Design and Construction"; Review of the Electrical Communications Laboratories; vol. 22, No. 3-4; Mar.-Apr. 1974; pp. 221-226.

Primary Examiner—Bernard Konick
Assistant Examiner—Randall P. Myers
Attorney, Agent, or Firm—Robert J. Black

[57] ABSTRACT

A telephone hookswitch actuator and handset support assembly arranged to allow a telephone instrument to be used as either a desk or wall unit. The actuator is constructed of two independently pivoting members, a first hookswitch actuator member controlling the "on-hook" and "off-hook" switching and a second alternatively positionable support member. When the telephone instrument is intended to be used as a desk unit a retaining device manipulated from the exterior of the telephone is adjusted out of contact with the support member allowing the support member and actuator to act in unison. When used as a wall unit the retaining device is adjusted into contact with the support member which then retains the member outwardly extended allowing a cavity on the handset to accept the support member, supporting the handset.

8 Claims, 5 Drawing Figures

TELEPHONE HOOKSWITCH ACTUATOR AND HANDSET SUPPORT ASSEMBLY

BACKGROUND OF THE INVENTION

1. Field of the Invention

This invention relates in general to a telephone substation apparatus and more particularly to an actuator and handset support which can allow a telephone substation apparatus to be used as either a desk or a wall unit.

2. Descripton of the Prior Art

For many years the telephone industry has recognized the desirability of manufacturing a telephone substation apparatus or telephone instrument which may be used as a desk unit or a wall unit. One of the problems encountered in designing such a telephone instrument is how to support the handset on the base. It is desirable that the handset rest on the base in the same position no matter whether the base is horizontal or vertical. However, in most telephone instruments the weight of the handset is the force that is used to maintain it on the base, and of course as the base shifts in position from horizontal to vertical, the direction in which the force acts also changes. Therefore, the type of handset support that operates best in one position may not be needed or may actually interfere with the use of the handset in the other position.

Further, since telephone subscribers are now allowed to purchase their own telephone instruments it becomes desirable from a retail standpoint to be able to offer a telephone instrument which can be either desk or wall mounted. This arrangement would be advantageous to the consumer allowing him to purchase a single telephone which can be used for example, in the kitchen or laundry room where telephones are typically wall mounted, or the bedroom or living room where the telephone is usually placed on a horizontal surface. Additionally, this is also an advantage to the manufacturer, negating the necessity for the manufacturer to design and produce two distinctly different telephones for a particular type of mounting.

In the past hookswitch actuators have been designed which operate in either a horizontal or vertical position, such as U.S. Pat. No. 3,558,832, to D. R. Bonis et al and U.S. Pat. No. 3,818,150, to I. Kunimine. Typically, these actuators have been mechanically complicated demanding a great number of mechanical adjustments to work properly. Further, they required supports either molded to the telephone housing or installed on the hookswitch actuator to allow the handset of the telephone to be supported on the base when wall mounted. U.S. Pat. No. 3,073,911, to C. F. Matke et al, teaches a telephone set which is operable in either a vertical or horizontal position. A support hook is provided which can be adjusted out of the base to support the handset to the telephone base when wall mounted. The telephone in this case must be disassembled in order to accomplish the adjustment which typically requires a trained telephone serviceman to accomplish. In most cases a consumer with limited technical knowledge would not be able to perform such an adjustment.

Accordingly, it is an object of the present invention to provide a novel and improved hookswitch actuator and handset support for a telephone instrument which will allow the telephone to be either desk or wall mounted.

It is a further object of the present invention to provide a handset support hook easily adjusted by the telephone subscriber allowing the telephone to be alternatively used as a wall unit.

SUMMARY

In accomplishing the objects of the present invention, there is provided as the environment a telephone instrument having a handset unit of a particular form and a base unit having an external form complementary to that of the handset, adapted to receive the handset unit. Such as the telephone set illustrated by U.S. Pat. No. 3,073,911 to C. F. Matke et al. It should be noted that the invention may also be applied to telephone bases illustrated by U.S. Pat. Nos. Des.237,506 and Des.245,113 in conjunction with handsets illustrated by U.S. Pat. No. Des.229,837 all to D. M. Genaro et al. The limitations here being that the base unit include a handset cradle area having a form complementary to the intended handset to be used. The handset is comprised of a front and back shell with the front shell including a transmitter cap and a receiver cap. The base unit includes a top surface inwardly recessed complementary to the handset receiver and transmitter caps, forming receiver and transmitter accepting areas respectively. The receiver accepting area further includes a longitudinally oriented aperture approximate the center of the accepting area.

The actuator and handset support according to the principles of the present invention includes a deflectable actuator disposed within the aperture under control of a spring loaded lever. The lever further controls hookswitch contacts located along with the lever within the telephone base unit. The actuator is normally biased upwardly through the aperture by the lever which also simultaneously closes the hookswitch line contacts when the handset is lifted from the base, representative of the "off-hook" condition. When the handset is replaced on the base the receiver cap displaces the actuator and lever allowing the line contacts to spring open, representative of the "on-hook" condition. The actuator is constructed as a two piece articulated unit with an operating member directly controlling the "on-hook" and "off-hook" switching and a support member alternatively adjustable between a first actuator associated condition, and a second handset support condition. The handset support condition is manually accomplished by an adjustment device located on the bottom of the base unit, much in the same manner as a ringer volume control. The adjustment device controls the action of the handset support. For example, operating the adjustment into a first position allows the telephone to be used in the horizontal position as a desk unit with the support member co-acting with the operating member. When "off-hook" the support member is upwardly biased by the operating member and when "on-hook" follows the operating member as it is displaced by the handset. In the second position the adjustment device retains the support member outwardly biased with the operating member operating normally. The support member acts as a hook where a cavity on the receiver cap of the handset is allowed to engage the support member retaining the handset to the base unit when wall mounted and "on-hook".

In this manner, conversion from a desk unit to a vertically positioned wall unit is accomplished without the addition of any extra parts, hooks, etc. and easily accomplished by the telephone subscriber.

BRIEF DESCRIPTION OF THE DRAWINGS

A better understanding of the invention may be had from the consideration of the following detailed description taken in conjunction with the accompanying drawings in which:

It should be noted that the handset shown on FIG. 3 and FIG. 4 is illustrated in a broken line disclosure for ease of understanding the hookswitch actuator and handset support operation.

DESCRIPTION OF THE PREFERRED EMODIMENT

Figure 1:
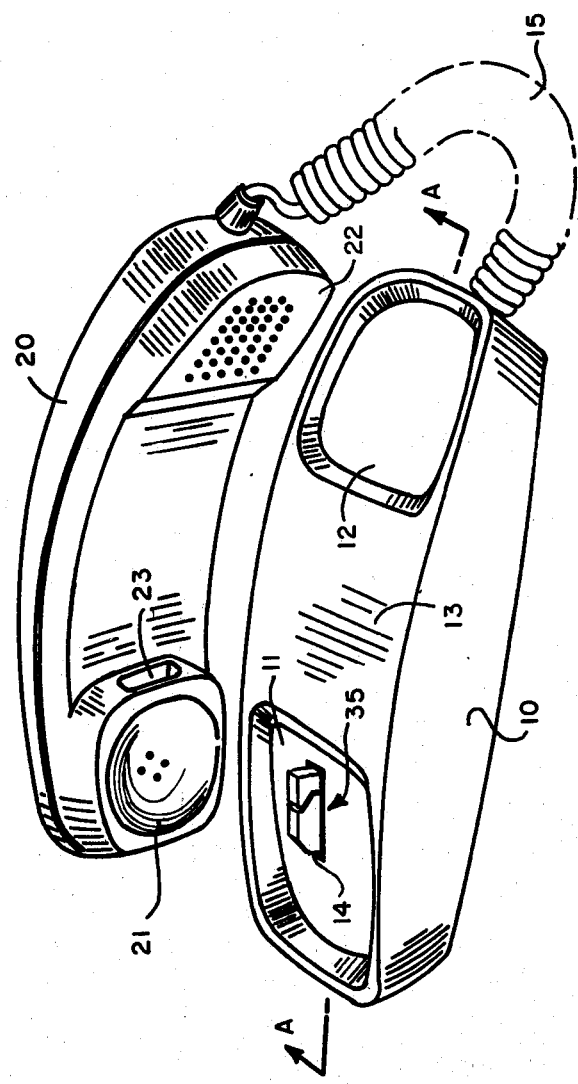
FIG. 1 is a perspective view of a telephone instrument of a type to which the invention may be used and including the actuator and handset support members as they would be oriented on the base unit in accordance with the present invention described herein.

Referring now to the accompanying drawings of the present invention, FIG. 1 illustrates a telephone instrument of a type of which the invention may be applied. The telephone instrument is comprised of a base unit 10 connected to a handset unit 20 by a handset cord 15. The handset further includes a front shell having a receiver cap 21 along with a cavity 23 and a transmitter cap 22 on an opposite end. Top surface 13 of base unit 10 includes inwardly recessed receiver and transmitter cap receiving areas 11 and 12 respectively. The receiving area 11 further includes a longitudinally oriented aperture 14 approximate the center of area 11 and arranged to accommodate actuator 35 therethrough. Receiving areas 11 and 12 are of a form complementary to the handset caps 21 and 22 respectively, allowing the handset to be rested on the base unit. It should be noted that the foregoing description of the telephone instrument with the exception of actuator 35 comprises the working environment of this embodiment and forms no part of the claimed invention.

Figure 3:
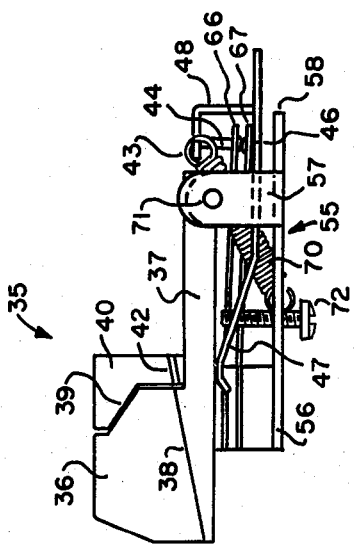
FIG. 3 is a left elevational view of the telephone hookswitch actuator and handset support assembly shown in FIG. 2.
Figure 2:
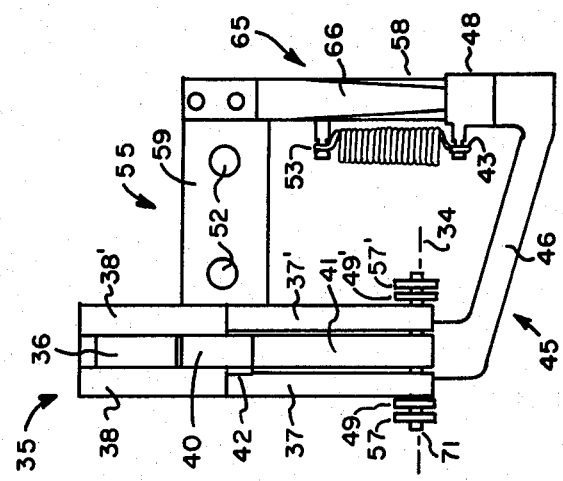
FIG. 2 is a top planar view of the telephone hookswitch actuator and handset support assembly according to the present invention.

Referring now to FIG. 2 and FIG. 3, the telephone hookswitch actuator and handset support assembly according to the principles of the present invention, is comprised of an actuator shown generally as 35, a force transfer lever 45, a mounting bracket 55, and a hookswitch contact assembly 65. Actuator 35 includes a generally rectangular operating member 36 which is integrally joined intermediate and perpendicular to a pair of spaced apart and parallel arms 37 and 37' on one end. An opposite end of each arm 37 and 37' includes a transversely oriented bore aligned along a common axis 34. Each arm 37 and 37' further includes sloping surfaces 38 and 38' respectively, adjacent operating member 36 and disposed to contact the bottom side of base surface 13 and limit the upward travel of operating member 36 through aperture 14. Operating member 36 further includes a support member receiving surface 39 arranged to accept a second leg of an L-shaped support member 40. A first leg of the support member is integrally joined perpendicular to one end of a support member arm 41. Arm 41 is positioned intermediate arms 37 and 37' with a transversely oriented bore aligned along common axis 34. A stop member 42 aligned along a common plane with surfaces 38 and 38' is intergally joined to support member 40 and is adapted to function in the same manner as surfaces 38 and 38'.

Force transfer lever 45 is comprised of a horizontal arm 46 intermediate an up-bent portion 47 and a L-shaped portion 48. The lever further includes upstanding arms 49 and 49' including a transversely oriented orifice in each arm arranged to align along common axis 34. L-shaped portion 48 further includes a insulated finger 44 and a spring mounting arm 43. Arm 43 is disposed to mount a first end of a helical tension spring 70 thereat. It should be noted that lever 45 with the exception of finger 44, which is of a insulative material such as plastic, is composed as a unitary structure from a rigid piece of material such as metal or the like.

Mounting member 55 is a generally U-shaped member including a leg 56 having a pair of upstanding arms 57 and 57', with each leg including a transversely oriented orifice aligned along common axis 34. An opposite leg 58 has hookswitch assembly 65 mounted thereon and a spring mounting arm 53 adapted to mount a second end of spring 70. An intermediate leg 59 includes mounting holes 52 for securing member 55 to the interior of the telephone base. Mounting member 55 is also composed as a unitary structure of a rigid material such as metal or the like.

Hookswitch contact assembly 65 includes at least two contact leaf springs 66 and 67 which are normally biased open. It should be noted that more than one pair of springs maybe used in the assembly 65 which is commonly referred to as a "pile-up" and only one pair is used in this embodiment for reasons of simplification.

With renewed reference to FIG. 2 the elements previously described are assemblied as shown with mounting arms 57 and 57' providing a support for lever arms 49, 49', operating member arms 37, 37' and support member arm 41 respectively. The associated bore in each arm is aligned along common axis 34 and a pin 71 is inserted longitudinally through all the bores. With the installation of pin 71 lever 45, operating arms 37 and 37' and support member 41 each freely pivot about axis 34 allowing for either coactive or independent arcuate displacement of each. As shown on FIG. 3 with spring 70 installed portion 48 is pulled downward allowing finger 44 to urge contact 66 and 67 closed and simultaneously up bent portion 47 to displace arms 37 and 37' upward. This is considered a normal position for the assembly and is indicative of the "off-hook" condition as shown in FIG. 1. Support member 40 is carried upward by operating member receiving surface 39 and is not controlled directly by lever portion 47. Support member 40 is used to advantage by the action of a retaining element 72, in this case a threaded fastener mounted perpendicular to and directly under arm 41 through a threaded bore on leg 56 of support member 55.

Figure 4:
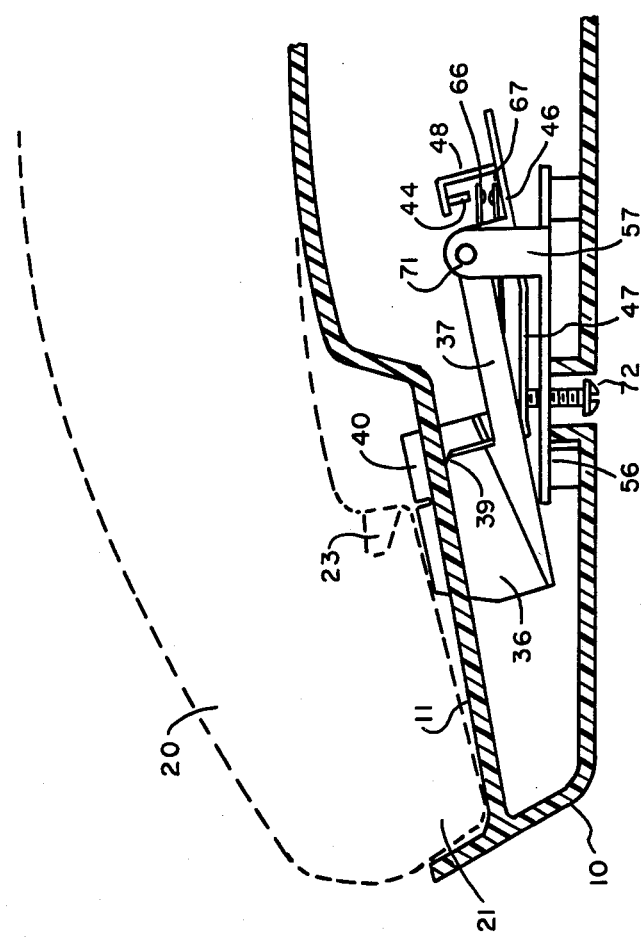
FIG. 4 is a larger scale, partly cut away sectional view, of the base unit illustrated on FIG. 1 taken along line A—A, showing the operation of the hookswitch actuator and handset support in a horizontal orientation and in the "on-hook" condition.

Turning now to FIG. 4 the actuator and handset support assembly operation is shown in the "on-hook" condition, when the telephone instrument is used as a desk unit. For normal desk operation the retainer element 72 is positioned as shown so as not to contact support member arm 41. Handset 20 is rested on base unit 10 with the receiver cap 21 placed within receiver accepting area 11. The weight of the handset displaces operating member 36 into aperture 14 allowing arms 37 and 37' (37' not shown) to pivot about pin 71. Arms 37 and 37' urge portion 47 of lever 45 downward causing portion 48 and finger 44 to travel upward allowing spring contacts 66 and 67 to spring open. Support member 40 follows operating member 36 downward and continues to lie within receiving surface 39 when the operating member is fully deflected. The upward displacement of portion 48 expands tension spring 70 which remains expanded until the handset is lifted off the base unit allowing spring 70 to contract and the assembly to return to the "off-hook" condition as shown in FIG. 3. Support member 40 is urged upward in association with the upward displacement of operating member 36.

Figure 5:
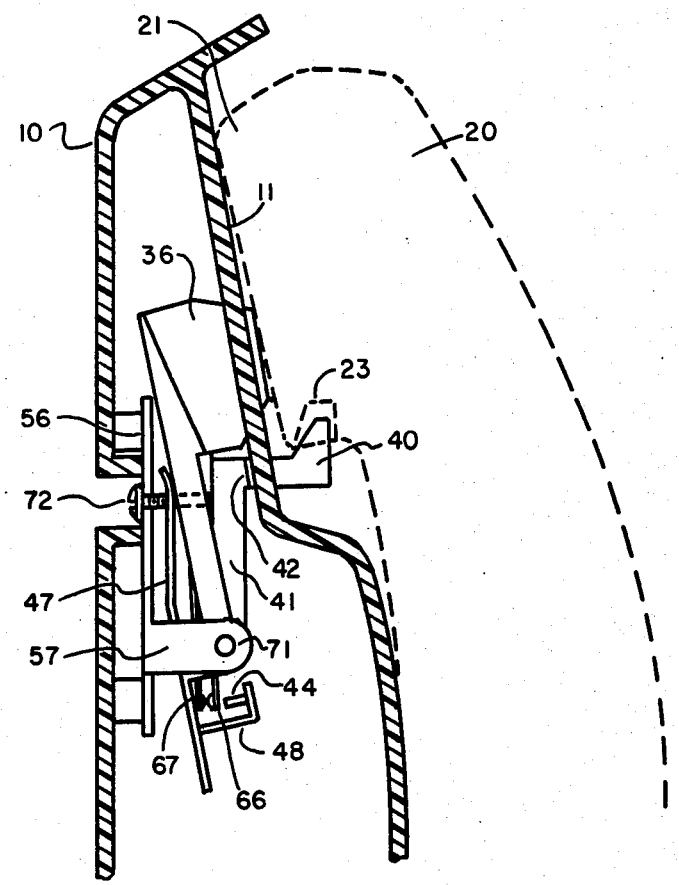
FIG. 5 is a larger scale, partly cut away sectional view, of the base unit illustrated on FIG. 1 taken along line A—A, showing the operation of the hookswitch actuator and handset support in a vertical orientation and in the "on-hook" condition.

To operate the telephone instrument as a vertically mounted wall unit retaining elements 72 is manually adjusted inward, in this embodiment by the use of a screwdriver, until it contacts support member arm 41. Support member 40 is thus locked in position and held outward of aperture 14 by the combined actions of stop member 42 and retainer 72 as shown on FIG. 5. Operating member 36 functions in the "on-hook" condition in the same manner as previously discribed in FIG. 4. Support member 40 is then used as a hook disposed to be inserted within cavity 23 on the handset unit, supporting the handset to the base unit. By readjusting the retaining element the telephone instrument can again be used as a desk unit simply and effectively without disassembly of the instrument.

The present invention has been described with reference to a specific embodiment thereof, for the purpose of illustrating the manner in which the invention may be used to advantage, it will be appreciated by those skilled in the art that the invention is not limited thereto. Accordingly, any and all modifications, variations or equivalent in arrangements which may occur to those skilled in the art should be considered to be within the scope of the invention.

What is claimed is:

1. An actuator and support assembly for use in a telephone instrument allowing said telephone instrument to be usable in a horizontal or alternatively a vertical position, said telephone instrument including a handset unit having receiving means thereon, a base unit having a top surface arranged to accept said handset unit and an aperture in said top surface and including switching means within said base unit, said actuator and support assembly comprising:
   a first actuator for operating said switching means, outwardly extending from said aperture;
   a second actuator in mutual association with said first actuator outwardly extending from said aperture and operable in a first condition when said telephone instrument is used in a horizontal position and alternatively in a second condition when said telephone instrument is used in a vertical position;
   retaining means selectively positionable out of contact with said second actuator placing said second actuator in said first condition or into contact with said second actuator placing said second actuator in said second condition; and
   said second actuator in said first condition responsive to positioning said retaining means, and said handset unit manually positioned on said base unit top surface, to displace said first actuator inwardly, operating said switching means and said second actuator simultaneously following said first actuator, and alternatively said second actuator in said second condition responsive to positioning said retaining means, and said handset unit manually positioned on said base unit top surface, to displace said first actuator inwardly operating said switching means and said second actuator retained outwardly to accommodate said handset unit receiving means thereon supporting said handset unit on the base unit.

2. An actuator and support assembly as recited in claim 1, wherein: said handset unit receiving means comprises a recessed cavity on an exterior surface of said handset unit.

3. An actuator and support assembly as recited in claim 1, wherein: said first actuator is comprised of a pair of rectangular and horizontally oriented arms parallel and spaced apart from each other, said arms including generally planar top and bottom surfaces, each arm further including a transversely oriented mounting orifice on one end and integrally joined at an opposite end to a rectangular operating member, said operating member vertically oriented and perpendicular to said arms top surface and including a support member receiving surface thereon, said operating member adapted to extend outwardly of said opening on said base unit top surface.

4. An actuator and support assembly as recited in claim 3 wherein: said second actuator is comprised of a rectangular and horizontally oriented arm including generally planar top and bottom surfaces and further including a transversely oriented mounting orifice on one end and an integrally joined L-shaped member on an opposite end, said L-shaped member including a first leg vertically oriented and perpendicular to said arm top surface and a second support member leg perpendicular to said first leg and horizontally oriented away from said arm opposite end, said second actuator arm arranged to be positioned between said first actuator arms, said first actuator arms orifices aligned along a common axis with said second actuator arm orifice and said support member accommodated on said operating members support member receiving surface.

5. An actuator and support assembly as recited in claim 4, wherein: said switching means includes at least two spaced apart electrical contact springs adapted to be urged closed representative of a "off-hook" condition and allowed to spring open representative of a "on-hook" condition under mechanical control of a pivoting force transfer lever, said force transfer lever including a first end adjacent to an and in contact with at least one of said first actuator arms bottom surface and a second end in communication with said contact springs, said first actuator normally biased upwardly by said first end and said contact springs urged closed by said second end in said "off-hook" condition when said handset unit is removed from said base unit top surface, and alternatively said first end downwardly displaced by said first actuator allowing said second end to extend upwardly opening said contact springs in said "on-hook" condition when said handset unit is placed on said base unit top surface.

6. An actuator and support assembly as recited in claim 5, wherein: said force transfer lever further includes a pair of vertically oriented mounting arms parallel and spaced apart from each other and including an orifice in each arm, said orifices arranged to align along said common axis with said first and said second actuator orifices.

7. An actuator and support assembly as recited in claim 6, wherein: said first and second actuators said contact springs and said force transfer lever are mounted on a U-shaped mounting member, said contact springs mounted on a first leg, a second leg directly opposite of said first leg includes a pair of vertically oriented arms, each of said arms including an orifice arranged to align along said common axis of said force transfer lever and said first and second actuator orifices, whereat a pin is longitudinally inserted therethrough, allowing said force transfer lever and said first and second actuators to be mounted thereat as a freely pivoting assembly, said base member further including mounting means for mounting said assembly within said telephone instrument base unit.

8. An actuator and support assembly as recited in claim 7, wherein: said retaining means comprises a threaded shaft carried in a threaded bore on said base member, said bore positioned directly under said second actuator arm allowing said shaft to be positioned perpendicular to said second actuator arm bottom surface and manually adjustable into and out of contact with said actuator arm bottom surface from the exterior of said telephone instrument base unit.

* * * * *